United States Patent
Kohiyama et al.

(10) Patent No.: US 7,913,094 B2
(45) Date of Patent: Mar. 22, 2011

(54) INFORMATION REPRODUCING APPARATUS AND SECURE MODULE

(75) Inventors: Kiyoshi Kohiyama, Kawasaki (JP); Takayuki Hasebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 652 days.

(21) Appl. No.: 10/305,187

(22) Filed: Nov. 27, 2002

(65) Prior Publication Data

US 2003/0126457 A1 Jul. 3, 2003

(30) Foreign Application Priority Data

Dec. 27, 2001 (JP) ................................. 2001-397629

(51) Int. Cl.
*G06F 11/30* (2006.01)
*G06F 12/14* (2006.01)

(52) U.S. Cl. ........ 713/193; 713/161; 713/168; 713/187; 713/192; 725/17; 725/26; 380/201; 380/239; 380/255

(58) Field of Classification Search .................... 713/193
See application file for complete search history.

(56) References Cited

U.S. PATENT DOCUMENTS

| | | | | |
|---|---|---|---|---|
| 4,757,534 A | * | 7/1988 | Matyas et al. ................... | 705/56 |
| 5,237,616 A | * | 8/1993 | Abraham et al. ............. | 713/193 |
| 5,677,952 A | * | 10/1997 | Blakley et al. ................. | 713/189 |
| 5,742,680 A | * | 4/1998 | Wilson ........................... | 380/227 |
| 5,768,382 A | * | 6/1998 | Schneier et al. .............. | 380/251 |
| 5,825,880 A | * | 10/1998 | Sudia et al. .................... | 713/180 |
| 6,055,314 A | * | 4/2000 | Spies et al. .................... | 380/228 |
| 6,296,191 B1 | * | 10/2001 | Hamann et al. ................ | 235/492 |
| 6,363,488 B1 | * | 3/2002 | Ginter et al. ....................... | 726/1 |
| 6,411,712 B1 | * | 6/2002 | Yoshida et al. ................. | 380/37 |
| 6,421,279 B1 | * | 7/2002 | Tobita et al. ............. | 365/189.01 |
| 6,473,858 B1 | * | 10/2002 | Shimomura et al. .......... | 713/150 |
| 6,483,576 B1 | * | 11/2002 | Gardner .......................... | 356/71 |
| 6,606,707 B1 | * | 8/2003 | Hirota et al. ................... | 713/172 |

(Continued)

FOREIGN PATENT DOCUMENTS

EP 1059578 A2 12/2000

(Continued)

OTHER PUBLICATIONS

"Protect Software from Inverse Analysis and Falsification, Details of Tamper Resistant Software Technique," NIKKEI Electronics, vol. 706, p. 209-220, Jan. 5, 1998, CSDB No. Domestic Technical Magazine 1997-00873-006.

(Continued)

*Primary Examiner* — Michael Pyzocha
*Assistant Examiner* — Shewaye Gelagay
(74) *Attorney, Agent, or Firm* — Staas & Halsey LLP

(57) ABSTRACT

In an information reproducing apparatus having an open architecture, a secure module stores first information, and has a structure which does not allow access to the first information from outside, and a memory has a structure which can be accessed from outside. A decryption unit loaded in the memory decrypts an encryption applied to the first information by using a predetermined key. A key supply unit implemented in the secure module supplies the predetermined key to the decryption unit. An authentication unit implemented in the secure module supplies second information to the decryption unit, refers to third information returned in response to the second information, and checks for authenticity of the decryption unit. A key-supply stop unit implemented in the secure module stops supply of the predetermined key by the key supply unit when the authentication unit does not authenticate the decryption unit.

32 Claims, 11 Drawing Sheets

U.S. PATENT DOCUMENTS

| | | | |
|---|---|---|---|
| 6,636,773 B1 * | 10/2003 | Tagawa et al. | 700/94 |
| 6,724,296 B1 * | 4/2004 | Hikita et al. | 340/5.61 |
| 6,792,280 B1 * | 9/2004 | Hori et al. | 455/517 |
| 6,865,431 B1 * | 3/2005 | Hirota et al. | 700/94 |
| 6,895,506 B1 * | 5/2005 | Abu-Husein | 713/193 |
| 6,898,708 B2 * | 5/2005 | Hori et al. | 713/171 |
| 6,948,070 B1 * | 9/2005 | Ginter et al. | 713/193 |
| 7,028,187 B1 * | 4/2006 | Rosen | 713/175 |

FOREIGN PATENT DOCUMENTS

| | | |
|---|---|---|
| JP | 8-125651 A | 5/1996 |
| JP | 9-282155 A | 10/1997 |
| JP | 10-210023 A | 8/1998 |
| JP | 10-242956 A | 9/1998 |
| JP | 2001-34584 A | 2/2001 |
| JP | 2001-350727 A | 12/2001 |

OTHER PUBLICATIONS

Japanese Office Action dated Oct. 3, 2008 for related Japanese Patent Application No. 2001-397629.

* cited by examiner

INFORMATION REPRODUCING APPARATUS AND SECURE MODULE

CROSS-REFERENCE TO RELATED APPLICATIONS

This application is based upon and claims priority of Japanese Patent application No. 2001-397629, filed on Dec. 27, 2001, the contents being incorporated herein by reference.

BACKGROUND OF THE INVENTION

1) Field of the Invention

The present invention relates to an information reproducing apparatus and a secure module. In particular, the present invention relates to an information reproducing apparatus for reproducing information which is transmitted through a transmission medium or stored in a recording medium, and a secure module which is detachably mounted on an information reproducing apparatus and executes processing related to security when the information reproducing apparatus reproduces information which is transmitted through a transmission medium or stored in a recording medium.

2) Description of the Related Art

Recently, use of the broadband Internet and digital television are widely spreading, and right protection technology for securing safety of delivered content (mainly digital AV content) is coming to the fore. In particular, personal computers (PCs) use open architectures, and can be peeped at by basically anybody. Therefore, it has been considered that securing of safety is difficult.

However, the personal computers are main gates of the broadband Internet. Therefore, if safety of the personal computers can be secured, the digital AV content can be delivered to the entire Internet. That is, the securing of safety of the personal computers is very significant.

The conventional attempts mainly made to protect rights on personal computer software are concealment and obfuscation of algorithms for securing safety. However, once software is installed in a main memory of a personal computer, copying is easy, and the algorithms for protecting rights can be analyzed by putting much time in analysis of the copied software. That is, the conventional systems for protecting rights are considered to be very insecure. In particular, since damage from analysis of copied software in highly public systems such as broadcasting systems is considered to be serious, it is difficult to use the conventional systems for protecting rights in the highly public systems.

FIG. 10 is a diagram illustrating an example of a construction of a conventional system using a personal computer. As illustrated in this diagram, the conventional system comprises a personal computer 50, a network 51, a speaker 52, a display device 53, and an input device 54.

The personal computer 50 comprises a CPU (central processing unit) 50a, a ROM (read-only memory) 50b, a RAM (random access memory) 50c, an HDD (hard disk drive) 50d, an MB (multimedia board) 50f, I/Fs (interfaces) 50g and 50h, and a bus 50i. The personal computer 50 decodes information which is downloaded through the network 51, and outputs the decoded information to the speaker 52 and the display device 53.

The CPU 50a performs various types of processing and controls the respective portions of the apparatus, in accordance with programs stored in the HDD 50d.

The ROM 50b stores data, programs which are executed by the CPU 50a, and other information.

The RAM 50c temporarily stores data and programs to be executed by the CPU 50a when CPU 50a performs the various types of processing.

The HDD 50d stores data, the programs executed by the CPU 50a, and the like.

The MB 50f decodes encoded sound data and image data which are supplied from the CPU 50a, generates an original sound signal and an original image signal, and outputs the generated original sound signal and image signal to the speaker 52 and the display device 53, respectively.

The I/F 50g is an interface for transmission and reception of information through the network 51, and performs protocol conversion and data format conversion.

The I/F 50h converts data supplied from the input device 54, into an internal format of the personal computer 50.

The bus 50i interconnects the CPU 50a, the ROM 50b, the RAM 50c, the HDD 50d, the MB 50f, and the I/Fs 50g and 50h, and enables exchange of information between the CPU 50a, the ROM 50b, the RAM 50c, the HDD 50d, the MB 50f, and the I/Fs 50g and 50h.

The network 51 is constituted by, for example, the Internet, and the personal computer 50 exchanges information with a server or the like connected to the network 51.

The speaker 52 converts a sound signal supplied from the MB 50f, into sound corresponding to the sound signal, and outputs the sound.

The display device 53 is constituted by, for example, a CRT (cathode ray tube) monitor or a liquid crystal monitor, and displays an image corresponding to an image signal supplied from the MB 50f.

The input device 54 is constituted by, for example, a mouse or a keyboard, and generates and outputs information corresponding to user manipulation.

FIG. 11 is a diagram illustrating a flow of information in the personal computer 50 illustrated in FIG. 10.

As illustrated in FIG. 11, the HDD 50d stores basic software, a decryption-key group, and encrypted content. The basic software is software for performing processing for decrypting the encrypted content, and other processing, and is obfuscated in order to prevent decryption by a malicious user. In the obfuscation, the following processing is performed.

Before obfuscation:

$$X=X+Y$$

After obfuscation:

$$X=X*2+1+Y*2-1$$

$$X=X\div 2$$

That is, although the results of calculations before and after the obfuscation are identical, it is difficult to analyze the algorithm after the obfuscation.

The decryption-key group is a group of a plurality of keys for decrypting encryptions applied to the encrypted content. In order to prevent a malicious user from easily acquiring the decryption keys, the decryption keys are confidentially scrambled, and stored in a secret place.

The encrypted content is content on which encryption processing is performed, and is constituted by, for example, images, sound, computer data, and the like.

When reproduction of the encrypted content is started, the following processing is executed.

(1) The obfuscated basic software is read out from the HDD 50d, and loaded in the RAM 50c.

(2) Thereafter, the basic software read out as above is stored in a secret place when necessary, and a confidentially scrambled decryption key is read out from the HDD 50d. For example, the decryption keys are stored in three to five secret places. Further, a provision is made so that a desired key can be obtained only when secret calculation or the like is performed.

(3) The encrypted content is read out, and the encryption applied to the content is decrypted by using the decryption key.

(4) Subsequently, in the case where the decrypted content is compressed, expansion processing (such as MPEG expansion processing in the case of video content or MPEG audio expansion processing in the case of audio content) is performed. Data obtained by the processing is stored in an image buffer and a sound buffer in the RAM 50c, and is then output to the MB 50f.

(5) The MB 50f performs D/A conversion processing of the supplied image data so as to obtain a sound signal, executes drawing processing in accordance with the image data so as to obtain an image signal, and outputs the sound signal and the image signal to the speaker 52 and the display device 53, respectively.

However, in the above processing, the basic software is loaded in the RAM 50c in the personal computer 50. Therefore, there is a danger that the basic software is decrypted or copied by a malicious user. Even in the case where all of the basic software and other software which are stored in the HDD 50d are encrypted, when software for decrypting an encryption exists in a place in the personal computer 50, and a place in which a decryption key is stored is determined by analyzing the software for decrypting the encryption, the basic software can be analyzed and the algorithm for protecting rights is revealed.

Therefore, highly public networks such as broadcasting networks require a processing method which does not allow easy decryption of content even when an algorithm is revealed. In the current hardware-dominated digital television receivers, encryptions based on MULTI2, DES (data encryption standard), and the like are used. Although the algorithms of those encryptions are well known, it is impossible to decrypt the encryptions applied to content unless "decryption keys" are known.

In addition, the "decryption keys" are built in hardware, and the apparatuses are configured so that the "decryption keys" cannot be read out onto software. Further, since decryption circuits and content processing circuits (e.g., MPEG video expansion circuits and MPEG audio expansion circuits) are also realized by hardware, it is very difficult to peep at details of the processing. Therefore, it is considered that hardware-dominated digital broadcast receiver is safe, and such systems are already commercialized. The receivers for SKY PerfecTV (trademark) in Japan and DirecTV (trademark) in the United States are good examples of the hardware-dominated digital broadcast receivers.

On the other hand, in the case of software processing, the "decryption keys," "decryption circuits," and "content processing circuits" (e.g., MPEG video expansion circuits and MPEG audio expansion circuits) are realized by software, and basic software realizing the processing per se and progress of calculations are loaded in the RAM 50c, which can be easily accessed. That is, it is easy to analyze and peep at the basic software per se and the progress of calculations.

SUMMARY OF THE INVENTION

The present invention is made in view of the above problems, and the object of the present invention is to provide an information reproducing apparatus and a secure module which enable safe software processing by adding a minimum amount of hardware to an apparatus having an open architecture such as a personal computer.

In order to accomplish the above object, an information reproducing apparatus for reproducing information which is transmitted through a transmission medium or stored in a recording medium is provided. The information reproducing apparatus comprises: a secure module storing first information and having a structure which does not allow access to the first information from outside; a memory which can be accessed from outside; a decryption unit which is loaded in the memory, and decrypts an encryption applied to the first information by using a predetermined key; a key supply unit which is implemented in the secure module, and supplies the predetermined key to the decryption unit; an authentication unit which is implemented in the secure module, supplies second information to the decryption unit, refers to third information returned in response to the second information, and checks for authenticity of the decryption unit, where the second information is predetermined; and a key-supply stop unit which is implemented in the secure module, and stops supply of the predetermined key by the key supply unit when the authentication unit does not authenticate the decryption unit.

In addition, in order to accomplish the above object, a secure module is provided. The secure module can be detachably mounted on an information reproducing apparatus and executes processing related to security when the information reproducing apparatus reproduces information which is transmitted through a transmission medium or stored in a recording medium, where the information reproducing apparatus includes a memory which can be accessed from outside, and decryption unit which is loaded in the memory, and decrypts an encryption applied to the first information by using a predetermined key. The secure module comprises: a key supply unit which is implemented in the secure module, and supplies the predetermined key to the decryption unit; an authentication unit which is implemented in the secure module, supplies second information to the decryption unit, refers to third information returned in response to the second information, and checks for authenticity of the decryption unit, where the second information is predetermined; and a key-supply stop unit which is implemented in the secure module, and stops supply of the predetermined key by the key supply unit when the authentication unit does not authenticate the decryption unit.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Embodiments of the present invention are explained below with reference to drawings.

Figure 1:
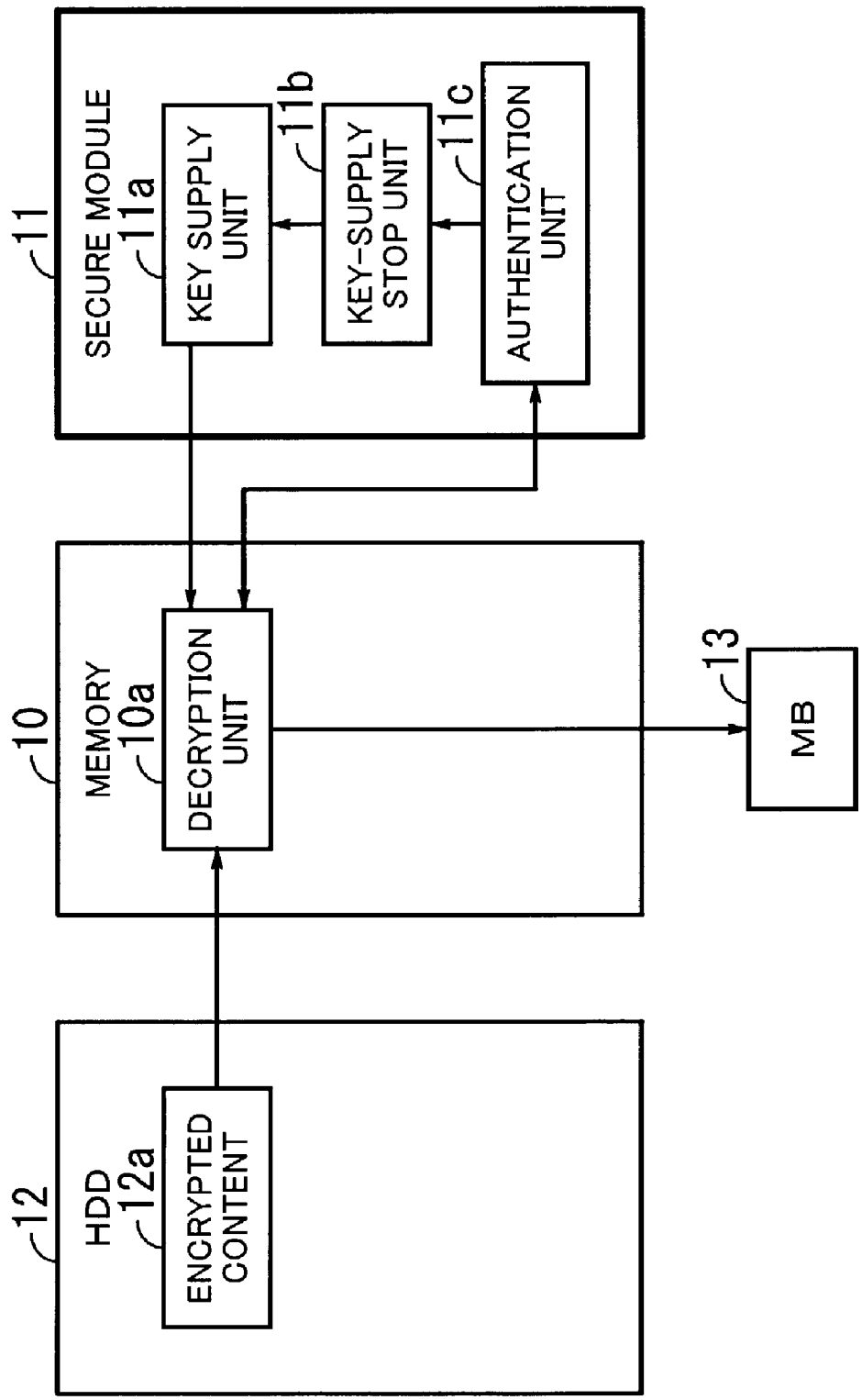
FIG. 1 is a diagram for explaining an operational principle of the present invention.

FIG. 1 is a diagram for explaining an operational principle of the present invention. As illustrated in FIG. 1, the information reproducing apparatus according to the present invention comprises a memory 10, a secure module 11, an HDD 12, and an MB (multimedia board) 13.

The memory 10 is constituted by, for example, a RAM, and a decryption unit 10a, which is realized by software, is loaded in the memory 10.

The secure module 11 is constituted by, for example, a PC card. Since the secure module 11 has a TRM (tamper resistant module) structure, it is possible to prevent peeping from outside and tampering of internal data.

In the secure module 11, a key supply unit 11a, a key-supply stop unit 11b, and an authentication unit 11c are implemented.

The key supply unit 11a supplies a decryption key to the decryption unit 10a.

The authentication unit 11c supplies predetermined information to the decryption unit 10a, refers to information which is returned as a result of the supply of the predetermined information, and checks for authentication of the decryption unit 10a.

When the authentication unit 11c does not confirm the authenticity of the decryption unit 10a, the key-supply stop unit 11b stops the supply of the key to the decryption unit 10a.

The MB 13 acquires content decrypted by the decryption unit 10a which is loaded in the memory 10, converts the content into audio and image signals, and supplies the audio and image signals to a speaker and a display device, respectively.

Next, operations of the construction illustrated in FIG. 1 are explained.

The secure module 11 is a detachable module. For example, it is possible to attach the secure module 11 to a main body of the information reproducing apparatus when the key supply unit 11a, the key-supply stop unit 11b, and the authentication unit 11c are installed in the information reproducing apparatus.

The decryption unit 10a to be loaded in the memory 10 is stored in advance in the secure module 11, and transferred to the memory 10 on startup. Alternatively, the decryption unit 10a is encrypted and stored in the HDD 12 in advance, transferred to the memory 10 on startup, and decrypted in the memory 10 by using a key stored in the secure module 11.

In the above situation, when reproduction is started, first, the authentication unit 11c supplies secret information to the decryption unit 10a. The decryption unit 10a acquires the secret information, obtains predetermined information by performing predetermined processing of the secret information, and supplies the predetermined information to the authentication unit 11c.

The authentication unit 11c refers to the information returned from the decryption unit 10a, and checks the returned information for authenticity of the decryption unit 10a. When the authentication unit 11c confirms the authenticity of the decryption unit 10a, the key supply unit 11a supplies a decryption key to the decryption unit 10a.

On the other hand, when the authentication unit 11c does not confirm the authenticity of the decryption unit 10a, the key-supply stop unit 11b stops the supply of the key from the key supply unit 11a to the decryption unit 10a.

When the authentication unit 11c confirms the authenticity of the decryption unit 10a, the decryption unit 10a decrypts the encrypted content 12a which is read out from the HDD 12, by using the key supplied from the key supply unit 11a, and supplies the decrypted content to the MB 13.

The MB 13 converts audio data and image data contained in the decrypted content (supplied from the decryption unit 10a) into a sound signal and an image signal, respectively, and supplies the sound signal and the image signal to the speaker and the display device (which are not shown), respectively.

After the reproduction is started, the authentication unit 11c in the secure module 11 also supplies secret information to the decryption unit 10a at predetermined time intervals, and prevents unauthorized copying and tampering of the decryption unit 10a.

As explained above, in the information reproducing apparatus according to the present invention, the secure module 11, which cannot be peeped at from outside, is provided, authenticity of the decryption unit 10a loaded in the memory 10 is checked for by the operations initiated by the secure module 11, and a key is supplied when the authenticity is confirmed. Therefore, even in personal computers using an open architecture or similar apparatuses, the security can be improved by adding a minimum amount of hardware.

In addition, since the authentication unit 11c regularly checks for the authenticity of the decryption unit 10a, it is possible to prevent unauthorized analysis of the decryption unit 10a loaded in the memory 10 and falsification such as disguise (spoofing) or the like.

Hereinbelow, details of the embodiments of the present invention are explained.

Figure 2:
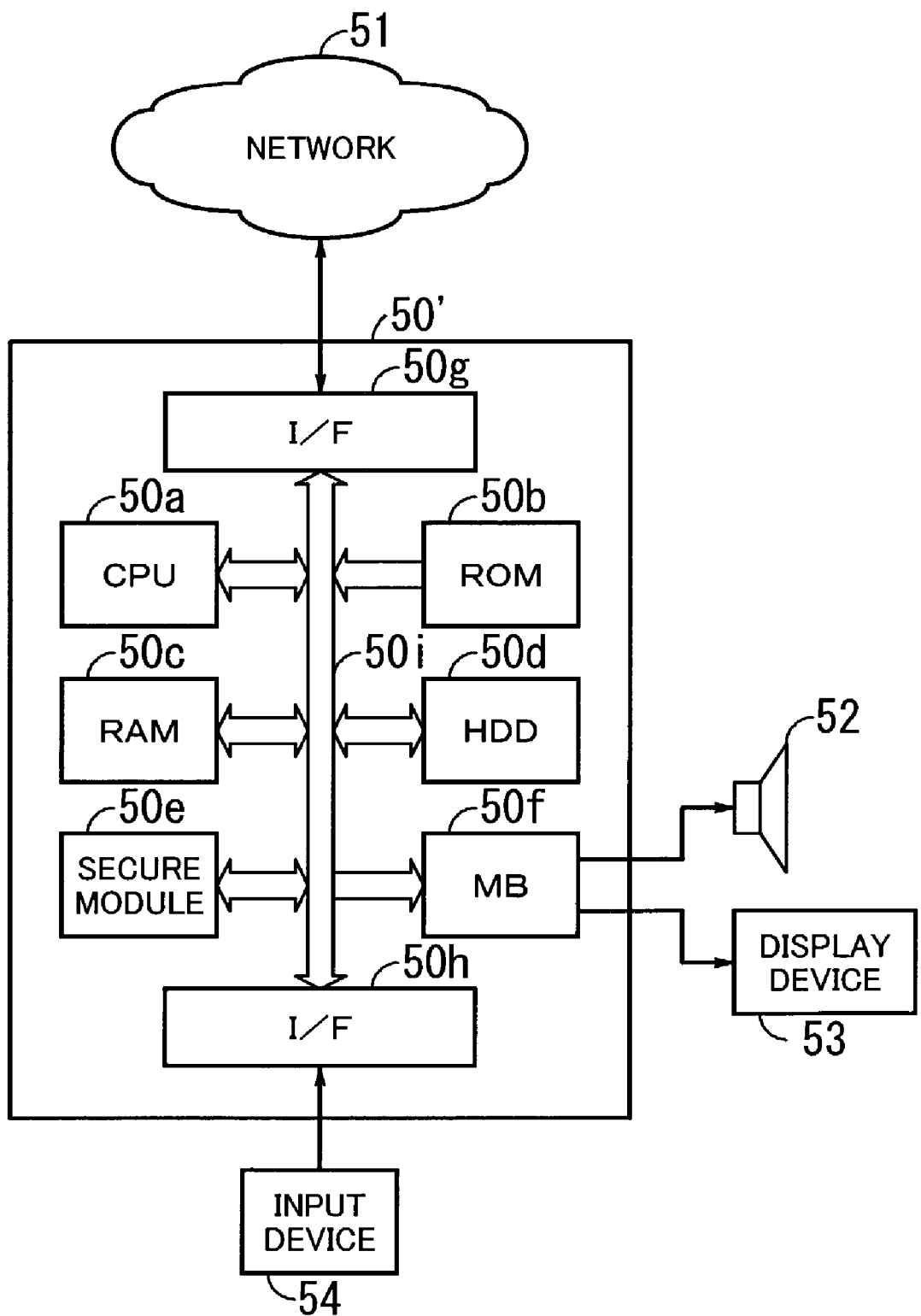
FIG. 2 is a diagram illustrating an example of a construction of a first embodiment of the present invention.

FIG. 2 is a diagram illustrating an example of a construction of the first embodiment of the present invention. As illustrated in FIG. 2, the system including the information reproducing apparatus according to the present invention comprises a personal computer (information reproducing apparatus) 50', a network 51, a speaker 52, a display device 53, and an input device 54.

The personal computer 50' comprises a CPU (central processing unit) 50a, a ROM (read-only memory) 50b, a RAM (random access memory) 50c, an HDD (hard disk drive) 50d, a secure module 50e, an MB (multimedia board) 50f, I/Fs (interfaces) 50g and 50h, and a bus 50i. The personal computer 50' decodes information downloaded through the network 51, and outputs the decoded information to the speaker 52 and the display device 53.

The CPU 50a performs various types of processing and controls the respective portions of the apparatus, in accordance with programs stored in the HDD 50d.

The ROM 50b stores programs which are executed by the CPU 50a, data, and the like.

The RAM 50c temporarily stores data and programs to be executed by the CPU 50a when the CPU 50a performs the various types of processing.

The HDD 50d stores data, the programs executed by the CPU 50a, and the like.

The secure module 50*e* is constituted by, for example, a PC card or the like, and stores information for authentication of users. Since the secure module 50*e* has a TRM structure, it is possible to prevent peeping from outside and tampering of internal data.

The MB 50*f* decodes encoded sound data and image data which are supplied from the CPU 50*a*, generates an original sound signal and an original image signal, and outputs the generated original audio and image signals to the speaker 52 and the display device 53.

The I/F 50*g* is an interface for transmission and reception of information through the network 51, and performs protocol conversion and data format conversion.

The I/F 50*h* converts data supplied from the input device 54, into an internal format of the personal computer 50'.

The bus 50*i* interconnects the CPU 50*a*, the ROM 50*b*, the RAM 50*c*, the HDD 50*d*, the secure module 50*e*, the MB 50*f*, and the I/Fs 50*g* and 50*h*, and enables exchange of information between the CPU 50*a*, the ROM 50*b*, the RAM 50*c*, the HDD 50*d*, the secure module 50*e*, the MB 50*f*, and the I/Fs 50*g* and 50*h*.

The network 51 is constituted by, for example, the Internet, and the personal computer 50' exchanges information with a content server or the like which is connected to the network 51.

The speaker 52 converts a sound signal supplied from the MB 50*f*, into sound corresponding to the sound signal, and outputs the sound.

The display device 53 is constituted by, for example, a CRT (cathode ray tube) monitor or a liquid crystal monitor, and displays an image corresponding to an image signal supplied from the MB 50*f*.

The input device 54 is constituted by, for example, a mouse or a keyboard, and generates and outputs information corresponding to user manipulation.

Figure 3:
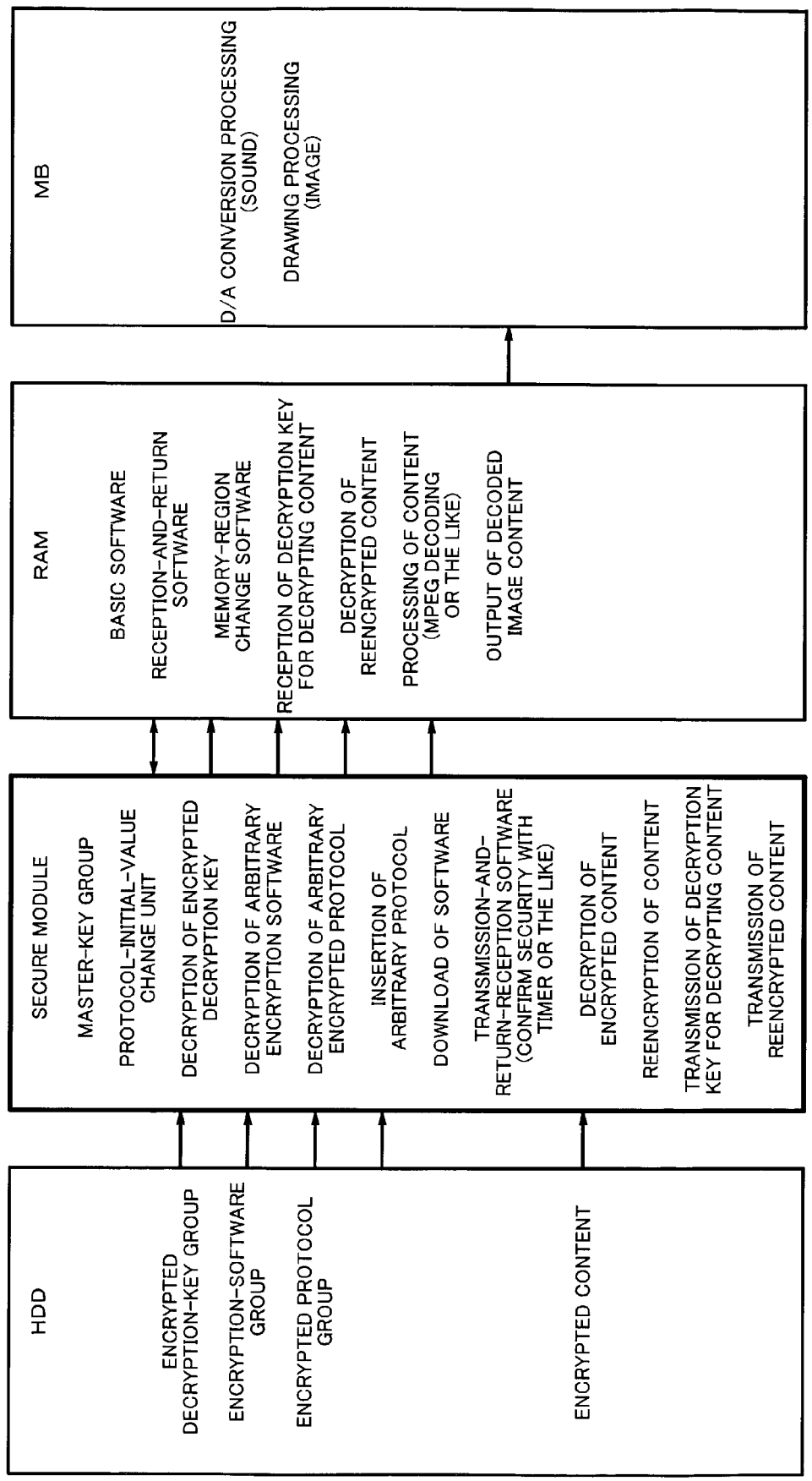
FIG. 3 is a diagram illustrating a flow of information in the first embodiment of FIG. 2.

FIG. 3 is a diagram illustrating a flow of information in the first embodiment of FIG. 2.

As illustrated in FIG. 3, the HDD 50*d* stores an encrypted decryption-key group, an encryption-software group, an encrypted protocol group, and encrypted content.

The encrypted decryption-key group is a group of keys for decrypting encryptions applied to the encrypted content.

The encryption-software group is a group of basic software items for decrypting encryptions.

The encrypted protocol group is a group of protocols which are inserted into the basic software items for authenticating the basic software items.

The encrypted content is content on which encryption processing is performed, and is constituted by, for example, sound data and image data.

In the secure module 50*e*, a master-key group, transmission-and-return-reception software, and other software exist.

The master-key group is a group of encrypted keys for decrypting the encrypted content.

The transmission-and-return-reception software exchanges information with reception-and-return software loaded in the RAM 50*c*, and checks for authenticity of the reception-and-return software.

The other software in the secure module 50*e* includes, for example, software for changing initial values in protocols, encrypted-encryption-key decryption software for decrypting encrypted encryption keys, arbitrary encryption software, arbitrary-encryption-protocol decryption software for decrypting arbitrary encrypted protocols, arbitrary-protocol insertion software for inserting an arbitrary protocol, software-downloading software for downloading software, encrypted-content decryption software for decrypting encrypted content, content-reencryption software for reencrypting content, content-decryption-key transmission software for transmitting a decryption key for decrypting content, and reencrypted-content transmission software for transmitting reencrypted content.

The RAM 50*c* stores secure software containing basic software, which includes the reception-and-return software, memory-region change software, content-decryption-key reception software, reencryption-content decryption software, content processing software, and decoded-image-content output software.

The reception-and-return software receives transmission from the secure module 50*e*, and returns an appropriate response.

The memory-region change software receives transmission from the secure module 50*e*, and changes memory regions used for storing data which require concealment (e.g., decryption keys, MPEG video/audio content after decryption, information storing regions after expansion of MPEG video/audio content, and the like).

The content-decryption-key reception software receives a key for decrypting an encryption applied to content.

The reencryption-content decryption software receives a key for decrypting content reencrypted in the secure module 50*e*.

The content processing software is constituted by MPEG video expansion software, MPEG audio expansion software, and the like.

The decoded-image-content output software outputs to the MB 50*f* image content and the like obtained by the content processing software.

The MB 50*f* performs D/A conversion processing and the like on sound information, and drawing processing and the like on image information.

Next, an outline of the operations in the first embodiment is explained below.

The fundamental mechanism for protecting rights in the first embodiment is as follows. That is, secure software is loaded every time by the secure module 50*e* in the RAM 50*c*. The loaded software includes a protocol for transmission and reception of secret numbers for confirming security of the secure software and other information. The security of the secure software is confirmed by real-time communication in accordance with the protocol.

At this time, in order to prevent copying of the secure software and analysis of the secret numbers for confirming the security and other information, the following measures are taken.

(1) A timer is provided in the secure module 50*e*, and a measure such as stop of supply of a decryption key from the secure module 50*e* is taken when an interval between a transmitting operation and a receiving operation is very great.

(2) In order to prevent copying and disguise of secure software, a measure such as stop of supply of a decryption key from the secure module 50*e* is taken, for example, when an identical secret number or the like is returned twice.

(3) Further, the secure software per se is replaced every time, for example, at intervals of about an hour. In order to realize this replacement, a plurality (actually, an infinite number) of secure software items are prepared in the secure module 50*e* or the HDD 50*d*, and a currently loaded secure software item is replaced with a different one. That is, although the functions as the secure software is common to all of the plurality of secure software items, the protocol for confirming security and the secret numbers are different between the plurality of secure software items. According to this configuration, even if the secure software is analyzed once, the secure software is replaced every time. Therefore, substantially the analysis of the secure software becomes impossible. Since it is considered basically difficult to analyze and falsify the secure software so as to output a calculation result as a file in a hour, sufficient security is achieved.

Alternatively, the secure software can be changed relatively easily, for example, by changing only transmission and reception protocols, or changing only initial values in protocols.

For example, transmission and reception functions for confirming security can be realized by using the following program which generates a secret number.

$$X=X+Y*Z*X$$

In the above formula, X is a secret number, and Y and Z are initial numbers for generating a secret number. Therefore, an infinite number of security confirmation protocols can be produced by only changing the values of X, Y, and Z arbitrarily.

For example, when the initial values are set as X=1, Y=3, and Z=5, X is changed as follows.

$$X=1 \rightarrow 16 \rightarrow 16+16 \times 15 \rightarrow \ldots$$

This is merely an example. In the case where the secure software is changed in the above simple manner, there is a possibility that the secure software is analyzed through a PCI bus to which the RAM 50c is connected even when the initial numbers are changed. Therefore, it is preferable to superimpose another formula on the above formula. Alternatively, when X becomes a certain value, processing such as a forceful conversion of the value of X to another value based on a special table is performed. In this case, even if the basic formula is leaked, the security can be maintained.

Further, even if the above formula is revealed, the analysis becomes very difficult by changing the secure software per se, for example, at the intervals of an hour.

Details of the operations of the system in the first embodiment are as follows.

(1) When a user wishes to view and listen to predetermined content, the user powers up the system, and clicks a predetermined icon displayed on the display device 53 by manipulating the input device 54.

(2) Then, the secure module 50e starts working, and randomly reads out one of the group of encrypted basic software items in the HDD 50d.

(3) Next, the encrypted basic software item is decrypted with a decryption key and decryption software in the secure module 50e.

(4) Next, appropriate one or more of the plurality of encrypted protocols are randomly read out, and decrypted with a decryption key and decryption software in the secure module 50e.

(5) The one or more of the plurality of encrypted protocols after the decryption are inserted into the decrypted basic software item so that secure software is produced.

(6) Initial values in the one or more of the plurality of encrypted protocols are initialized.

(7) The initialized secure software is loaded in (downloaded to) the RAM 50c, and started up. Then, the secure module 50e refers to the timer in the secure module 50e, and confirms that a secret number is transmitted from the secure software in accordance with a communication protocol without delay in order to prevent disguise of the secure software.

(8) The secure module 50e transmits a secret number by return.

(9) The secure module 50e waits for a return of a further secret number.

(10) The secure module 50e refers to the timer in the secure module 50e. When it takes a predetermined time or more to return the further secret number, the secure module 50e determines that the secure software is falsified, sends an error signal to the secure software, and stops the operation. In addition, when more than one identical secret number is successively returned, the secure module 50e may determine that the secure software is falsified, send an error signal to the secure software, and stop the operation.

(11) On the other hand, when a normal return is received in the predetermined time, the secure module 50e determines that the operation of the secure software is normal.

(12) The secure module 50e reads out encrypted content from the HDD 50d, and decrypts the encrypted content with a decryption key.

(13) The secure module 50e reencrypts the decrypted content.

(14) The secure module 50e transmits the reencrypted content to the secure software.

(15) The secure module 50e further confirms the security of the secure software by using another protocol, and then transmits to the secure software a decryption key for decrypting the reencrypted content.

(16) The secure module 50e repeats the above operations (8) to (15) until reproduction of the content is completed or the user instructs to complete the operation.

On the other hand, the secure software executes the following processing.

(1) The secure software receives the reencrypted content and the decryption key for decrypting the reencrypted content, from the secure module 50e through the transmission and reception of the secret numbers.

(2) The secure software decrypts the content by using the received decryption key for decrypting the reencrypted content.

(3) The secure software performs simple scrambling (e.g., using an exclusive OR operation) on the result of the decryption, and stores the scrambled result in a secret memory region determined by transmission and reception of the secret numbers and the like. In addition, leakage of information is prevented by changing the secret memory region on every occasion. Further, when registers used by the secure software are also changed on every occasion, it is possible to prevent analysis of internal operations through the registers. Furthermore, it is possible to prevent analysis of internal operations through an interruption by setting an interruption prohibit flag in transmission or reception of a secret number so as to prohibit interruptions from other software. The interruption prohibit flag can be used on every occasion when prevention of analysis is required, including every transmission or reception of a secret number.

(4) When the decrypted content is MPEG compressed image data, the secure software performs MPEG video expansion processing of the decrypted content stored in the secret memory region, as explained below. When the decrypted content is MPEG compressed sound data, the secure software performs MPEG sound expansion processing of the decrypted content. When the decrypted content is another type of content such as data broadcast or leader (caption) information, the secure software transfers the decrypted content to a processing routine corresponding to the type of content.

(5) For example, when the processed content is MPEG image data, the secure software stores the processing result in a buffer region in the RAM 50c. At this time, if the processing result is stored in a fixed region in the RAM 50c, the processing result can be peeped at. Therefore, the storage address is set based on communication with the secure module 50*e*, and is changed on every occasion. In addition, the scrambling method may also be set based on communication with the secure module 50*e*, and changed on every occasion.

(6) The result of the MPEG video decoding stored as above is transferred to the MB 50*f* through an AGP bus or the like by DMA (dynamic memory access) or the like. The MB 50*f* performs A/D conversion processing. Then, the result of the MPEG video decoding is converted in such a format that the result of the MPEG video decoding can be reproduced on a monitor or the like, and displayed. When the decrypted content is MPEG compressed sound data, the decrypted content is processed in a basically similar manner to the case of the MPEG compressed image data, and is finally transferred to the speaker, by which sound is reproduced.

As described above, in the first embodiment, the secure module 50*e* having a TRM structure checks for authenticity of the basic software loaded in the RAM 50*c*. Therefore, it is possible to improve security of the system having an open architecture.

In addition, since the protocol for checking for the authenticity is regularly changed, the security can be ensured even when the basic software is peeped at.

Next, the second embodiment is explained.

Figure 4:
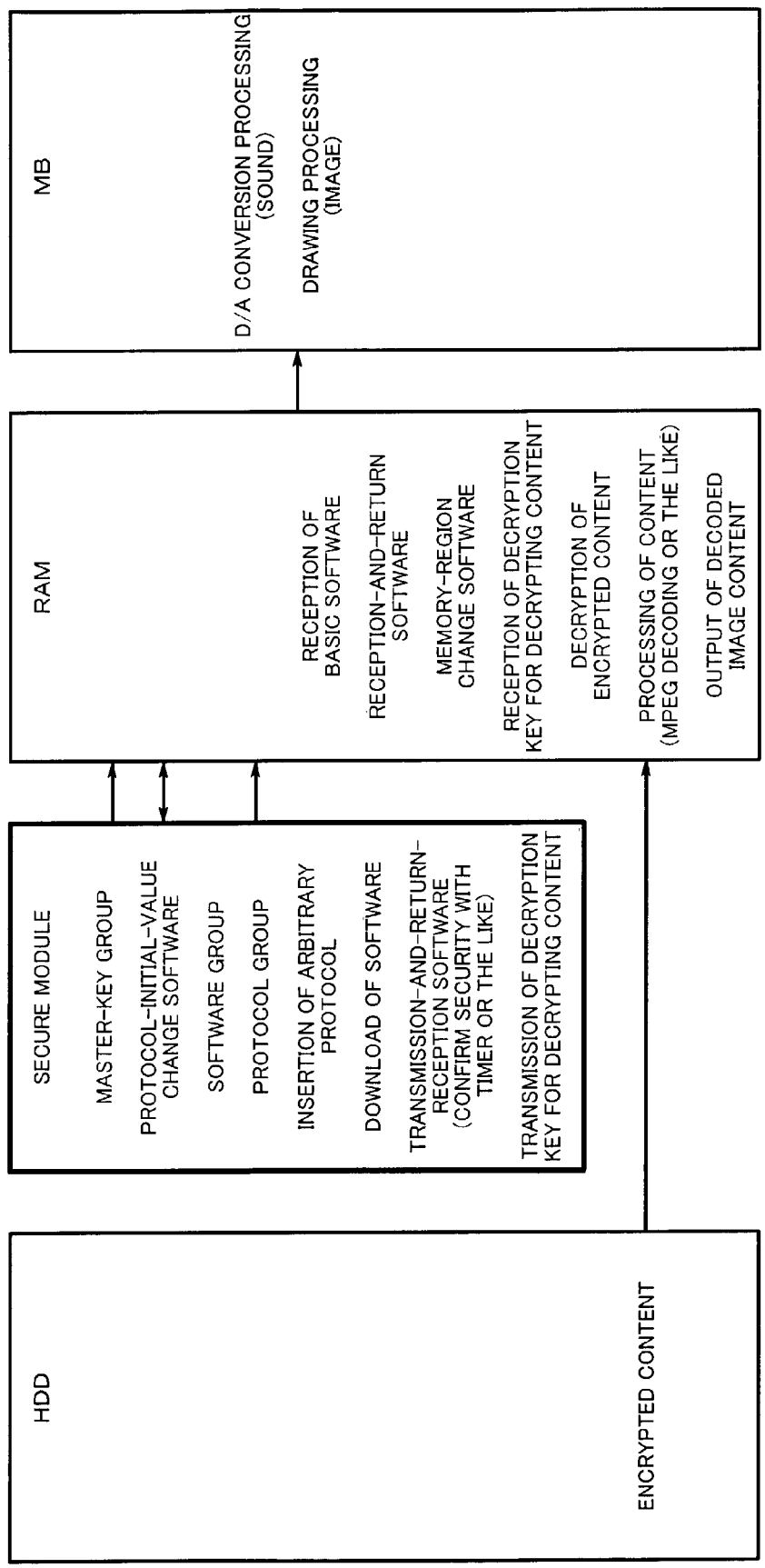
FIG. 4 is a diagram illustrating a flow of information in a second embodiment of the present invention.

FIG. 4 is a diagram for explaining an example of a construction of the second embodiment of the present invention. As illustrated in FIG. 4, the second embodiment of the present invention is characterized in that information stored in the HDD 50*d* is reduced, and instead, right protection information is stored in a memory region in the secure module 50*e*.

In this example, only encrypted digital AV content and the like are stored in the HDD 50*d*.

On the other hand, the secure module 50*e* contains (1) a master-key group, which is a group of encrypted keys for decrypting encrypted content, (2) software for changing initial values in a formula for calculating a secret number in each protocol, (3) a software group, (4) a protocol group, (5) software for inserting an arbitrary protocol into secure software, (6) software for downloading into the RAM 50*c* the secure software into which an arbitrary protocol is inserted, (7) software for transmission to the secure software, reception of a return from the secure software, and confirmation of security of the secure software, and (8) software for transmission of a decryption key for decrypting content. In addition, a timer (not shown) is provided in the secure module 50*e*, and the secure module 50*e* measures a time from transmission to reception, and stops supply of a decryption key for decrypting the content to the secure software when the time from transmission to reception is equal to or greater than a predetermined time.

The RAM 50*c* stores the secure software containing basic software, which includes (1) software for receiving the basic software, (2) reception-and-return software, (3) memory-region change software for changing a memory region, (4) content-decryption-key reception software for receiving a decryption key for decrypting content, (5) encrypted-content decryption software for decrypting encrypted content, (6) content processing software, and (7) decoded-image-content output software.

In addition, the secure module 50*e*, the HDD 50*d*, and the RAM 50*c* are interconnected through a general-purpose PCI bus, and exchange information with each other. The RAM 50*c* and the MB 50*f* are connected through a local bus such as an AGP bus, where the local bus does not allow interception unlike the general-purpose bus.

The operations of the system in the second embodiment are as follows.

(1) When a user wishes to view and listen to a digital broadcast on a personal computer, the user powers up the system, and clicks an icon displayed on the display device 53 for reception of the digital broadcast.

(2) The secure module 50*e* starts working, and randomly reads out one of a plurality of basic software items in the secure module 50*e*.

(3) The secure module 50*e* randomly reads out appropriate one or more of a plurality of encrypted protocols, and inserts the one or more protocols into the one of the plurality of basic software items so as to produce secure software.

(4) The secure module 50*e* initializes initial values in the one or more protocols.

(5) The secure module 50*e* loads (downloads) the initialized secure software in the RAM 50*c*, and starts up the secure software.

(6) The secure module 50*e* refers to the timer in the secure module 50*e*. When a predetermined time elapses, the secure module 50*e* confirms that a secret number is transmitted from the secure software in accordance with a communication protocol, where the predetermined time is set to a short time so as to prevent disguise of the secure software.

(7) The secure module 50*e* generates and transmits a secret number by return.

(8) The secure module 50*e* waits for a return of a secret number.

(9) The secure module 50*e* refers to the timer. When it takes a predetermined time or more to receive the return of the secret number, the secure module 50*e* determines that the secure software is possibly falsified, sends an error signal to the secure software, and stops the operation.

(10) On the other hand, when a normal return is received in the predetermined time, the secure module 50*e* determines that the operation of the secure software is normal. In addition, the secure module 50*e* further confirms the security of the secure software by using another protocol, and then transmits to the secure software a decryption key for decrypting the encrypted content.

(11) Thereafter, the secure module 50*e* repeats the above operations (8) to (10).

On the other hand, the secure software on the RAM 50*c* executes the following processing.

(1) The secure software receives the encrypted content from the secure module 50*e* through the transmission and reception of the secret numbers.

(2) The secure software receives from the secure module 50*e* the decryption key for decrypting the encrypted content.

(3) The secure software decrypts the content by using the received decryption key.

(4) The secure software performs scrambling on the result of the decryption, and stores the scrambled result in a secret memory region determined by transmission and reception of the secret numbers and the like, where the scrambling is performed by using, for example, an exclusive OR operation. It is preferable that the storage address is not fixed, and is changed on every storage operation.

(5) When the decrypted content is MPEG compressed image data, the secure software performs MPEG video expansion processing of the decrypted content stored in the secret memory region as explained below. When the decrypted content is MPEG compressed sound data, the secure software performs MPEG sound expansion processing of the decrypted content. When the decrypted content is another type of content such as data broadcast or leader (caption) information, the secure software transfers the decrypted content to a processing routine corresponding to the type of content.

(6) For example, when the processed content is MPEG image data, the secure software transfers the processing result to a buffer region in the RAM 50c. At this time, if the processing result is stored in a fixed region in the RAM 50c, the processing result can be peeped at. Therefore, the storage address is set based on communication with the secure module 50e, and is changed on every occasion. In addition, the scrambling method may also be set based on communication with the secure module 50e on every storage operation.

(7) The result of the MPEG video decoding stored as above is transferred to the MB 50f through an AGP bus or the like by DMA or the like. The MB 50f performs A/D conversion processing. Then, the result of the MPEG video decoding is converted in such a format which enables reproduction on the display device 53.

(8) When the decrypted content is MPEG compressed sound data, the decrypted content is processed in a basically similar manner to the case of the MPEG compressed image data, and is finally transferred to the speaker, by which sound is reproduced.

As described above, in the second embodiment, the information on the master-key group and the like is also stored in the secure module 50e, while such information is stored in the HDD 50d in the first embodiment. Therefore, the security of the system is improved compared with the first embodiment.

Next, the third embodiment is explained.

Figure 5:
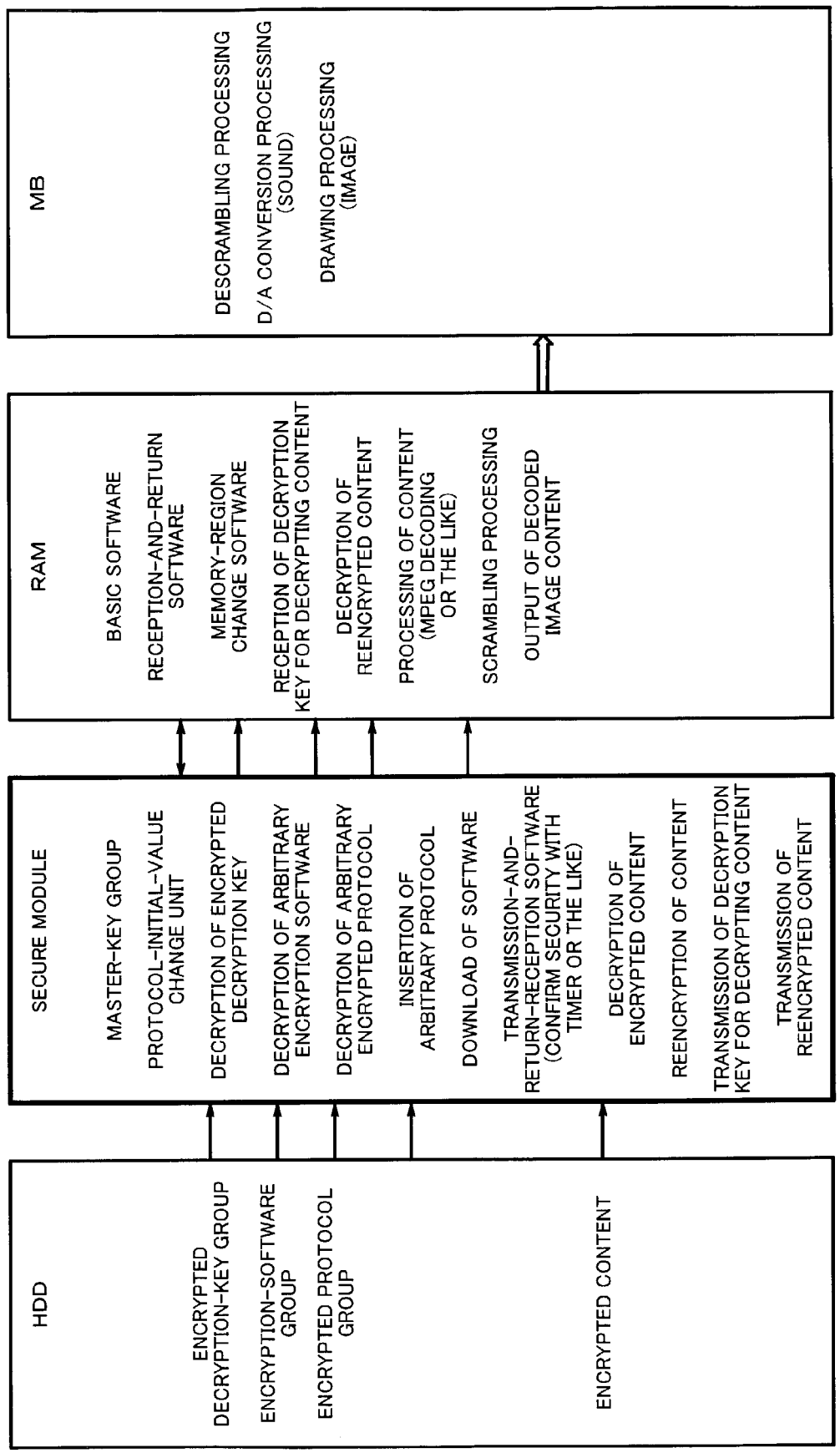
FIG. 5 is a diagram illustrating a flow of information in a third embodiment of the present invention.

FIG. 5 is a diagram illustrating a flow of information in the third embodiment of the present invention. As illustrated in FIG. 5, the third embodiment is different from the first embodiment illustrated in FIG. 3 in that scrambling processing software is additionally stored in the RAM 50c, and descrambling processing software is additionally stored in the MB 50f. Since the other portions in the third embodiment are identical to the first embodiment illustrated in FIG. 3, the explanations on the identical portions are not repeated.

The scrambling processing software performs predetermined scrambling on content on which MPEG decode processing or the like is performed.

The descrambling processing software performs predetermined descrambling on scrambled content in the RAM 50c, and reproduces original information.

Next, the operations of the third embodiment are briefly explained.

After transmission and reception of a key is performed between the HDD 50d and the secure module 50e in a similar manner to the aforementioned case, basic software is downloaded to and installed in the RAM 50c.

The basic software downloaded to the RAM 50c receives encrypted content through the secure module 50e, and decrypts the encryption. Then, the scrambling processing software performs the predetermined scrambling on the decrypted content, and transmits the scrambled content to the MB 50f.

The MB 50f receives the scrambled content transmitted from the RAM 50c, and corresponding descrambling software performs descrambling on the scrambled content so as to reproduce original content data.

In the case where the obtained content data is a sound signal, the sound signal is converted into an analog signal by D/A conversion processing, and the analog signal is output to the speaker 52. In addition, in the case where the obtained content data is an image signal, image drawing processing is performed so as to convert the image data into a video signal, which is output to the display device 53.

In the third embodiment described above, it is possible to prevent unauthorized output of the content data which is supplied from RAM 50c to the MB 50f.

Next, the fourth embodiment is explained.

Figure 6:
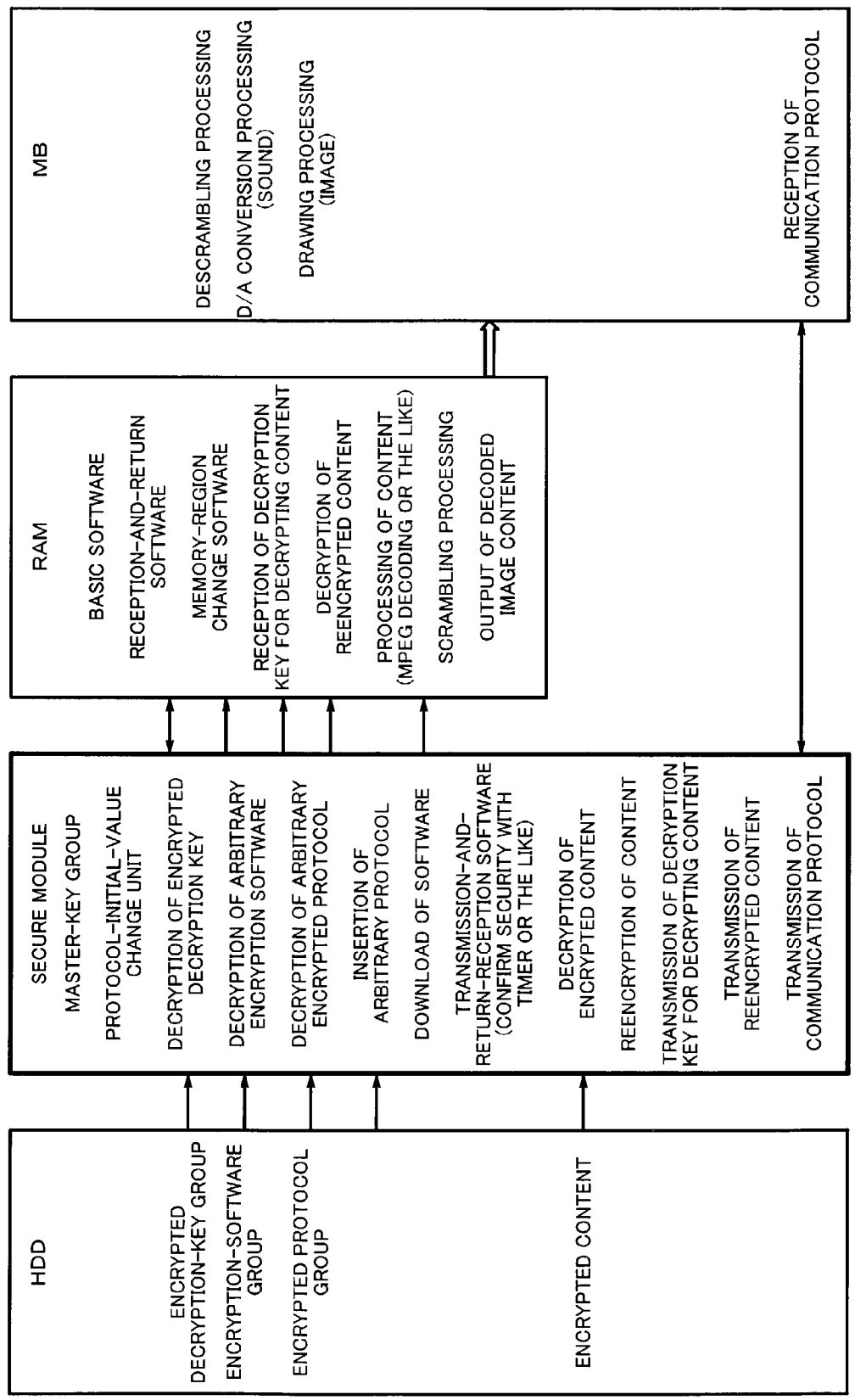
FIG. 6 is a diagram illustrating a flow of information in a fourth embodiment of the present invention.

FIG. 6 is a diagram illustrating an example of a construction of the fourth embodiment of the present invention. The fourth embodiment illustrated in FIG. 6 is different from the third embodiment illustrated in FIG. 5 in that the secure module 50e further contains communication-protocol transmission software, and the MB 50f further contains communication-protocol reception software. The other portions in the fourth embodiment are identical to the third embodiment illustrated in FIG. 5.

The communication-protocol transmission software stored in the RAM 50c sends to the MB 50f information (communication-protocol information) indicating a scrambling method for content data and an order of output of content data.

The communication-protocol reception software stored in the MB 50f receives the communication-protocol information transmitted by the communication-protocol transmission software, and supplies the communication-protocol information to applicable portions of the apparatus.

Next, the operations of the fourth embodiment are briefly explained.

When reproduction of content data is started, the communication-protocol transmission software in the secure module 50e sends the communication-protocol information to the MB 50f.

When the MB 50f receives the communication-protocol information, the MB 50f extracts descrambling processing software and information indicating the order of output of content data, from the communication-protocol information. Then, the MB 50f rearranges the order of the content data in accordance with the information extracted from the communication-protocol information, and performs descrambling processing of the rearranged content data.

The communication-protocol information is transmitted, for example, at predetermined time intervals. The descrambling method and the order of output are changed on every transmission. Therefore, even if the scrambling processing software in the RAM 50c is analyzed by a malicious user, different scrambling processing is performed at the next transmission timing. Thus, it is possible to prevent unauthorized use.

Next, the fifth embodiment is explained.

Figure 7:
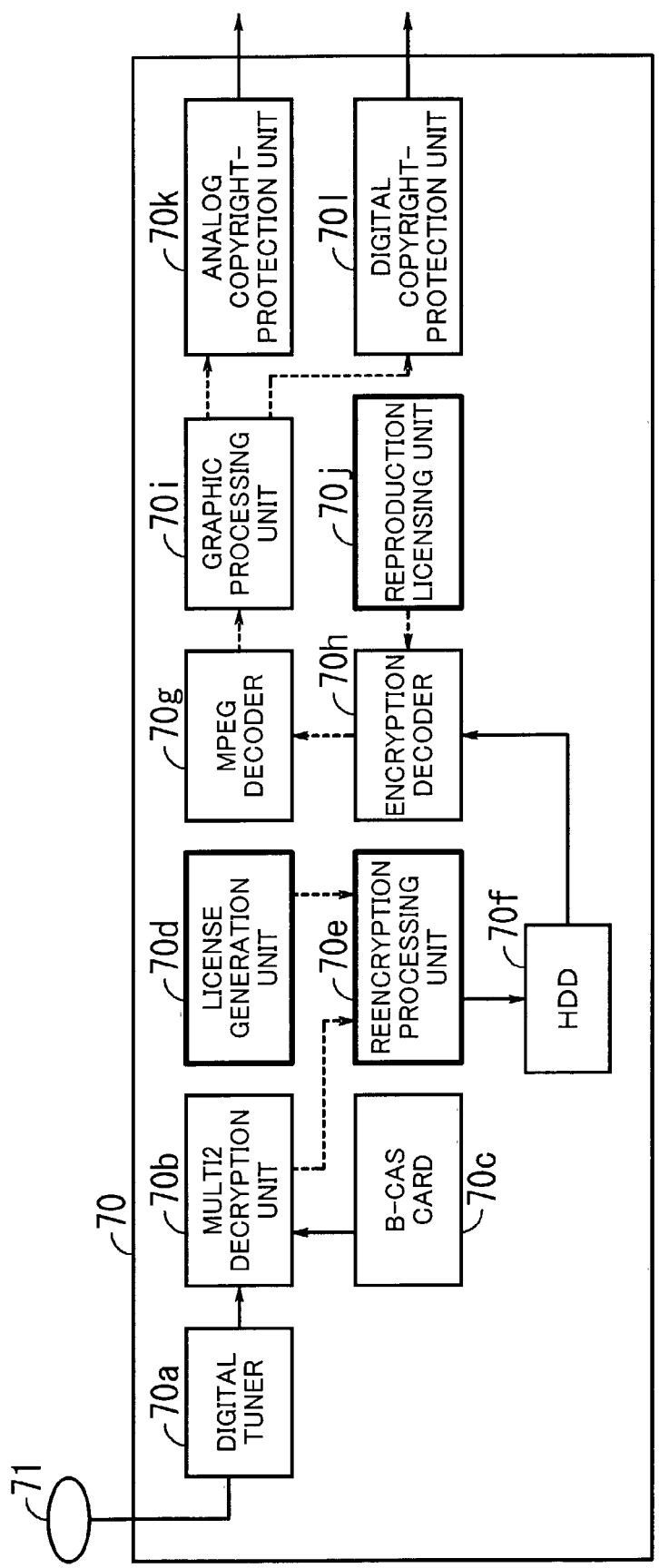
FIG. 7 is a diagram illustrating an example of a construction of a fifth embodiment of the present invention.

FIG. 7 is a diagram illustrating an example of a construction of the fifth embodiment of the present invention. As illustrated in FIG. 7, the fifth embodiment of the present invention is an example of a construction of a digital broadcast receiver.

The digital broadcast receiver 70 illustrated in FIG. 7 comprises a digital tuner 70a, a MULTI2 decryption unit 70b, a B-CAS (BS conditional access systems) card 70c, a license generation unit 70d, a reencryption processing unit 70e, an HDD 70f, an MPEG decoder 70g, an encryption decoder 70h, a graphic processing unit 70i, a reproduction licensing unit 70j, an analog copyright-protection unit 70k, and a digital copyright-protection unit 70l. In addition, a parabola antenna 71 is externally connected to the digital broadcast receiver 70.

The digital tuner 70a converts electromagnetic waves transmitted from a satellite and captured by the parabola antenna 71, into electric signals (digital signals), and outputs the electric signals (digital signals).

The MULTI2 decryption unit 70b decrypts MULTI2 encryptions applied to encrypted digital signals which are output from the digital tuner 70a, decodes the decrypted digital signals into original data, and outputs the original data.

The B-CAS card 70c is a plastic card in which an IC chip is built, and stores information for authentication of a user.

The license generation unit 70d generates license information required for reencryption, and supplies the license information to the reencryption processing unit 70e.

The reencryption processing unit 70e reencrypts the digital signals supplied from the MULTI2 decryption unit 70b, and supplies the reencrypted digital signals to the HDD 70f.

The HDD 70f stores in a predetermined region the data supplied from the reencryption processing unit 70e.

The encryption decoder 70h decodes encryptions applied to data which are read out from the HDD 70f, and generates original data.

The MPEG decoder 70g performs MPEG decode processing of the data supplied from the encryption decoder 70h, and generates image data and sound data.

The graphic processing unit 70i performs drawing processing based on the image data output from the MPEG decoder 70g and other image data, converts the image data into original image signals, and outputs the original image signals.

The reproduction licensing unit 70j supplies license information for decoding the encryptions by the encryption decoder 70h.

The analog copyright-protection unit 70k superimposes a signal for copy protection on analog image signals, and outputs the superimposed image signals.

The digital copyright-protection unit 70l encrypts digital image signals, and outputs the encrypted digital image signals.

In the construction of FIG. 7, the functions indicated with bold lines (i.e., the license generation unit 70d, the reencryption processing unit 70e, and the reproduction licensing unit 70j) are each a TRM (tamper resistant module). That is, each of the license generation unit 70d, the reencryption processing unit 70e, and the reproduction licensing unit 70j has a structure which does not allow access to internal information.

In addition, the dashed lines connecting function blocks in FIG. 7 indicate connections which are forbidden to be connected to outside for the purpose of copy protection.

Next, the operations of the fifth embodiment are explained.

The electromagnetic waves transmitted from the satellite and captured by the parabola antenna 71 are supplied to the digital tuner 70a, converted into an MPEG-TS digital stream by the digital tuner 70a, and output from the digital tuner 70a.

In the MPEG-TS digital stream, a plurality of information items are MULTI2-encrypted and time-division multiplexed. The MULTI2 decryption unit 70b refers to license information including a decryption key and the like and being supplied from the B-CAS card 70c, and decodes a program (specific digital AV content) in the MPEG-TS digital stream which is selected by a viewer.

The reencryption processing unit 70e refers to the license information supplied from the license generation unit 70d, reencrypts the AV content, and stores the reencrypts AV content in a predetermined region of the HDD 70f.

In order to reproduce encrypted digital AV content stored in the HDD 70f, the encryption decoder 70h acquires from the reproduction licensing unit 70j license information for decoding the encryption, performs processing for decoding the encryption, and generates original AV content.

The MPEG decoder 70g performs MPEG decode processing of the AV content decoded by the encryption decoder 70h so as to reproduce original image data, and supplies the original image data to the graphic processing unit 70i.

The graphic processing unit 70i performs graphic processing such as drawing processing based on the image data supplied from the MPEG decoder 70g, generates an image signal, and supplies the image signal to the analog copyright-protection unit 70k and the digital copyright-protection unit 70l.

The analog copyright-protection unit 70k superimposes a signal for copy protection on a predetermined portion of the image signal supplied from the graphic processing unit 70i, and outputs the superimposed image signal to a monitor.

The digital copyright-protection unit 70l encrypts the image signal supplied from the graphic processing unit 70i, and outputs the encrypted digital image signal to the monitor.

As mentioned before, the functions indicated with bold lines (i.e., the license generation unit 70d, the reencryption processing unit 70e, and the reproduction licensing unit 70j) in FIG. 7 each have a TRM structure. Therefore, it is possible to prevent unauthorized use of received content by a malicious user by providing functions corresponding to the key supply unit 11a, the key-supply stop unit 11b, and the authentication unit 11c as illustrated in FIG. 1 in the license generation unit 70d, the reencryption processing unit 70e, and the reproduction licensing unit 70j, checking authenticity at predetermined time intervals, and stopping supply of a key when the authenticity cannot be confirmed.

Next, the sixth embodiment is explained.

Figure 8:
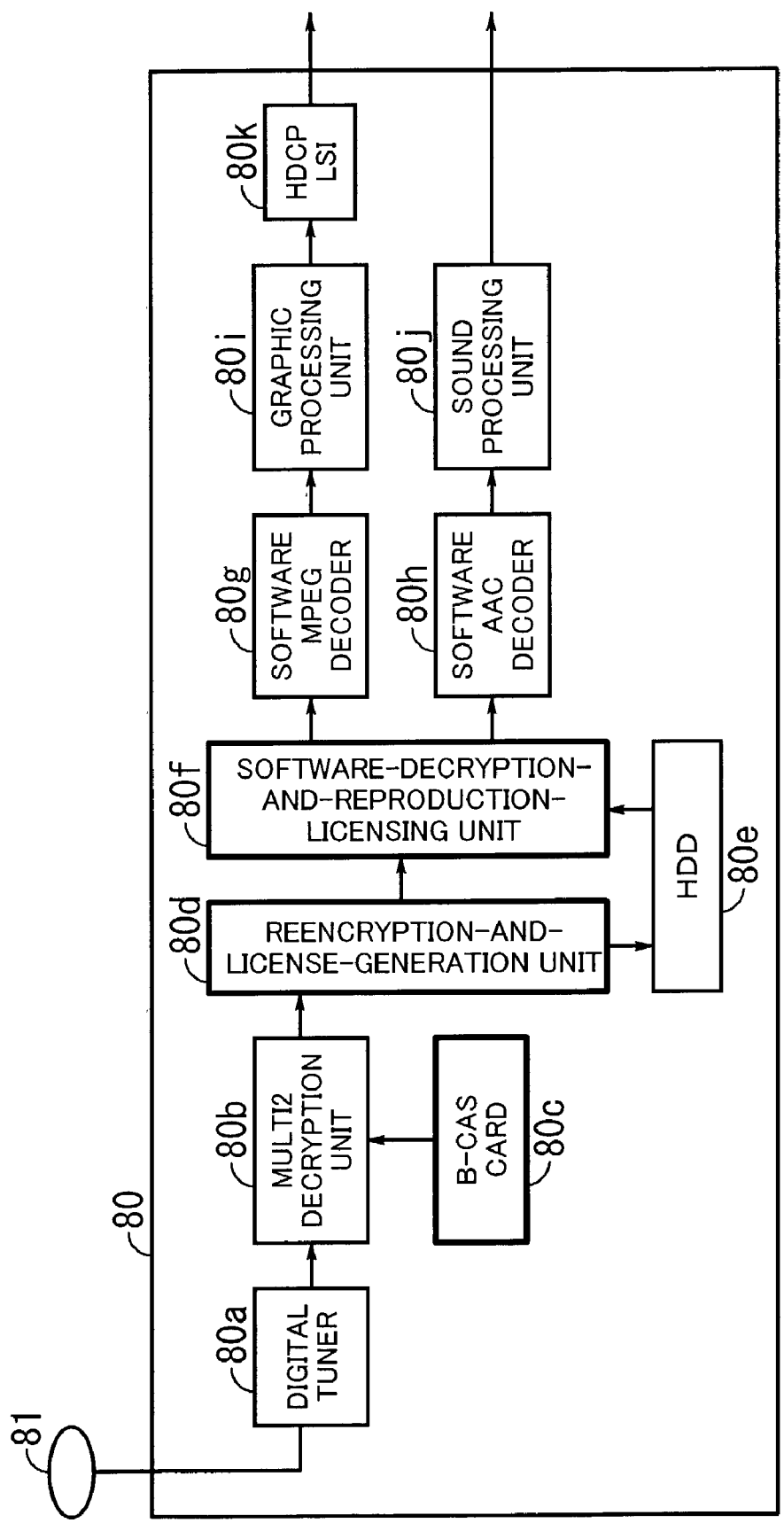
FIG. 8 is a diagram illustrating an example of a construction of a sixth embodiment of the present invention.

FIG. 8 is a diagram illustrating an example of a construction of the sixth embodiment of the present invention. As illustrated in FIG. 8, the digital broadcast receiver 80 illustrated in FIG. 8 comprises a digital tuner 80a, a MULTI2 decryption unit 80b, a B-CAS card 80c, a reencryption-and-license-generation unit 80d, an HDD 80e, a software-decryption-and-reproduction-licensing unit 80f, a software MPEG decoder 80g, a software AAC (advanced audio coding) decoder 80h, a graphic processing unit 80i, a sound processing unit 80j, and an HDCP (high-bandwidth digital content protection) LSI 80k. In addition, a parabola antenna 81 is externally connected to the digital broadcast receiver 80.

The digital tuner 80a converts electromagnetic waves transmitted from a satellite and captured by the parabola antenna 81, into electric signals (digital signals), and outputs the electric signals (digital signals).

The MULTI2 decryption unit 80b decrypts MULTI2 encryptions applied to encrypted digital signals which are output from the digital tuner 80a, decodes the decrypted digital signals into original data, and outputs the original data.

The B-CAS card 80c is a plastic card in which an IC chip is built, and stores information for authentication of a user.

The reencryption-and-license-generation unit 80d generates license information required for reencryption, and performs reencryption processing.

The HDD 80e stores in a predetermined region the data supplied from the reencryption-and-license-generation unit 80d.

The software-decryption-and-reproduction-licensing unit 80f generates a reproduction license, decodes encryptions applied to data which are read out from the HDD 80e, in accordance with the reproduction license, and generates original data.

The software MPEG decoder 80g performs MPEG decode processing of AV content supplied from the software-decryption-and-reproduction-licensing unit 80f, and generates image data.

The software AAC decoder 80h decodes sound signals, and generates and outputs original sound data.

The graphic processing unit 80i performs drawing processing of the image data supplied from the software MPEG decoder 80g, and outputs obtained image signals to the HDCP LSI 80k.

The HDCP LSI 80k performs HDCP processing of the image signals supplied from the graphic processing unit 80i, and outputs the processed image signals.

The sound processing unit 80j performs D/A conversion of the sound data output from the software AAC decoder 80h, and outputs the converted result.

In the construction of FIG. 8, the functions indicated with bold lines (i.e., the B-CAS card 80c, the reencryption-and-license-generation unit 80d, and the software-decryption-and-reproduction-licensing unit 80f) are each a TRM (tamper resistant module). That is, each of the B-CAS card 80c, the reencryption-and-license-generation unit 80d, and the software-decryption-and-reproduction-licensing unit 80f has a structure which does not allow access to internal information.

In addition, the software-decryption-and-reproduction-licensing unit 80f, the software MPEG decoder 80g, and the software AAC decoder 80h are realized by software.

Therefore, as in the fifth embodiment, it is possible to prevent unauthorized use of received content by a malicious user by providing the functions of the secure module 11 illustrated in FIG. 1 in the B-CAS card 80c, the reencryption-and-license-generation unit 80d, and the software-decryption-and-reproduction-licensing unit 80f, and arranging the function blocks realized by the software in FIG. 8 to have the functions in the memory 10 illustrated in FIG. 1.

Next, the seventh embodiment is explained.

Figure 9:
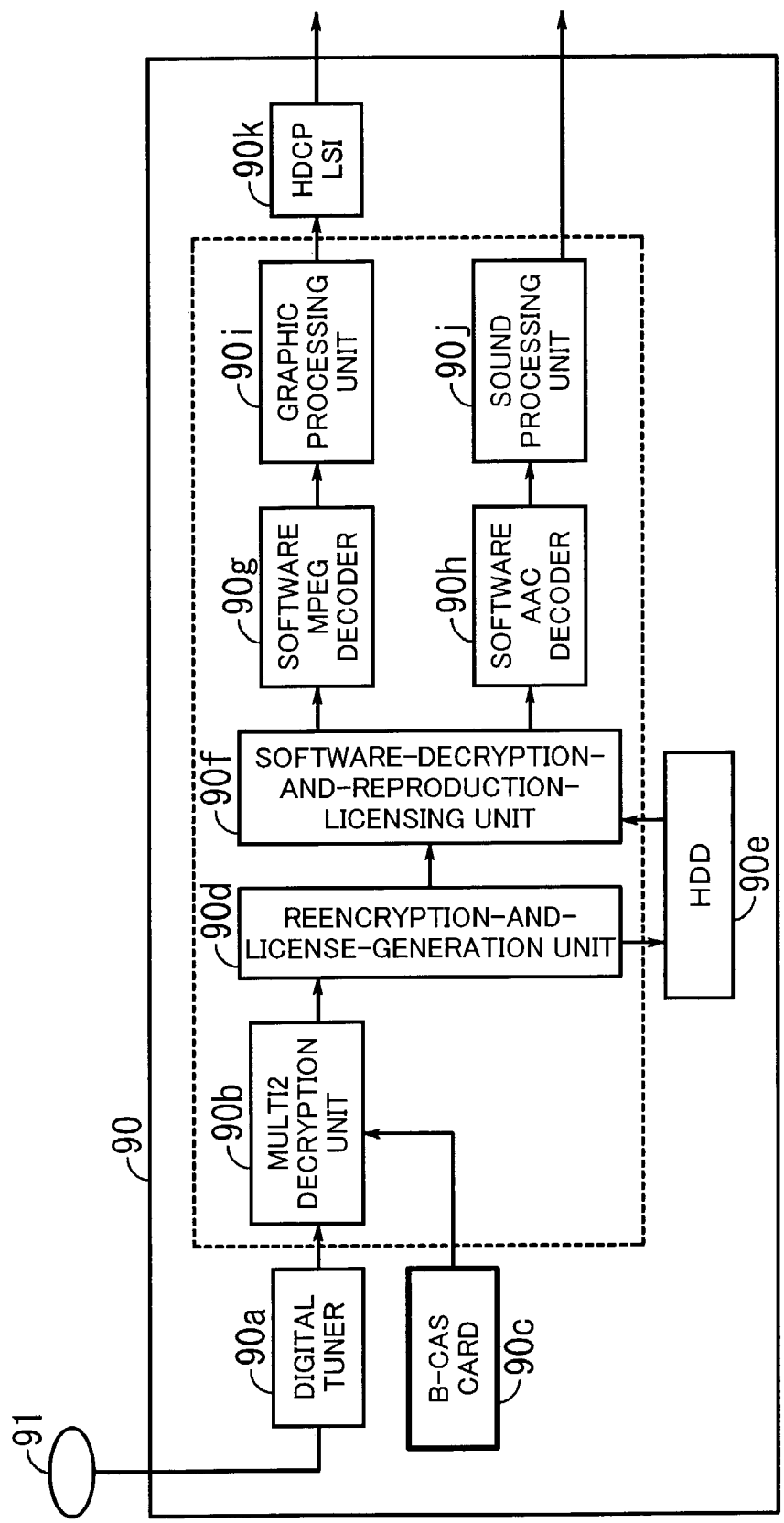
FIG. 9 is a diagram illustrating an example of a construction of a seventh embodiment of the present invention.
Figure 10:
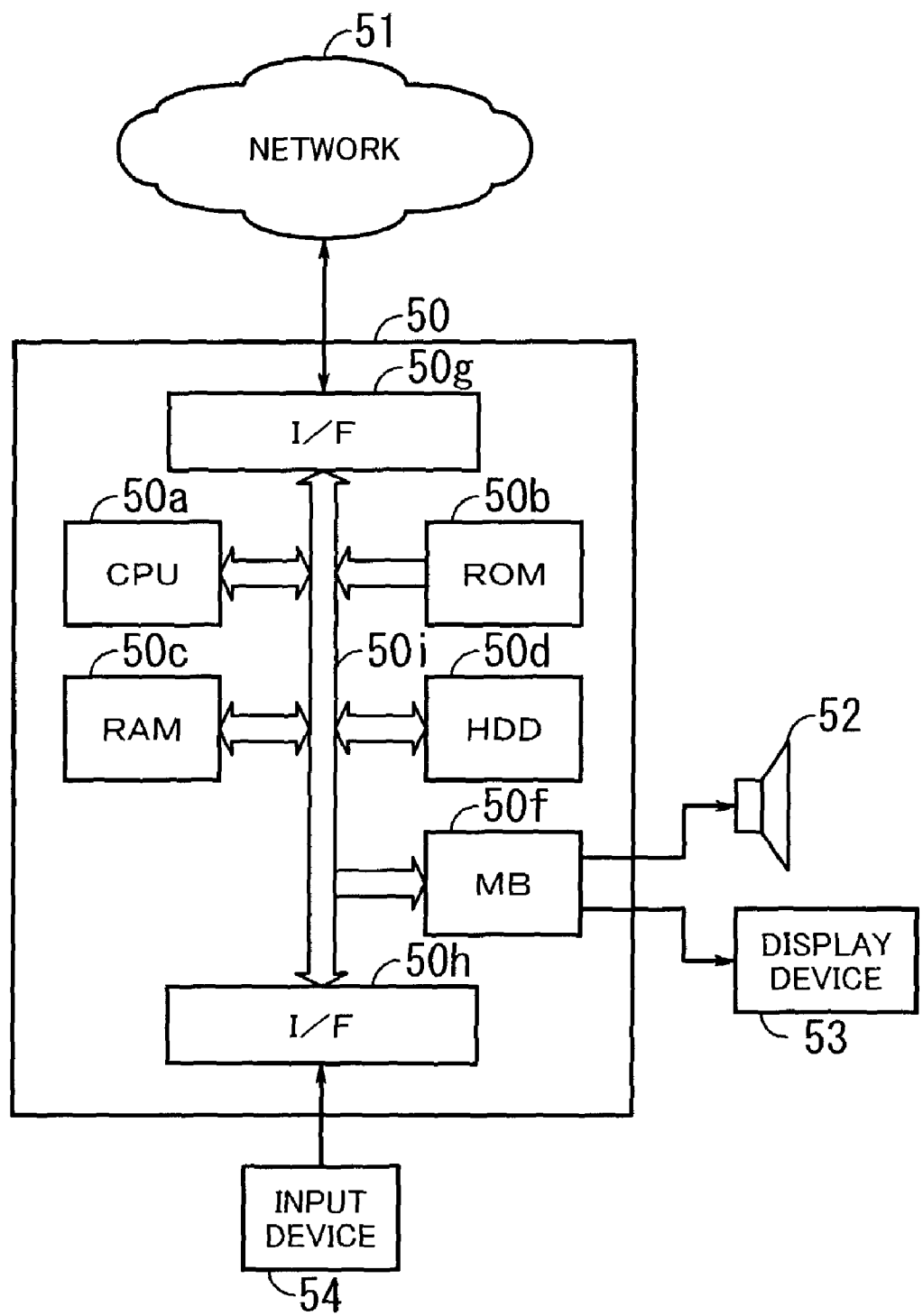
FIG. 10 is a diagram illustrating an example of a construction of a conventional system using a personal computer.
Figure 11:
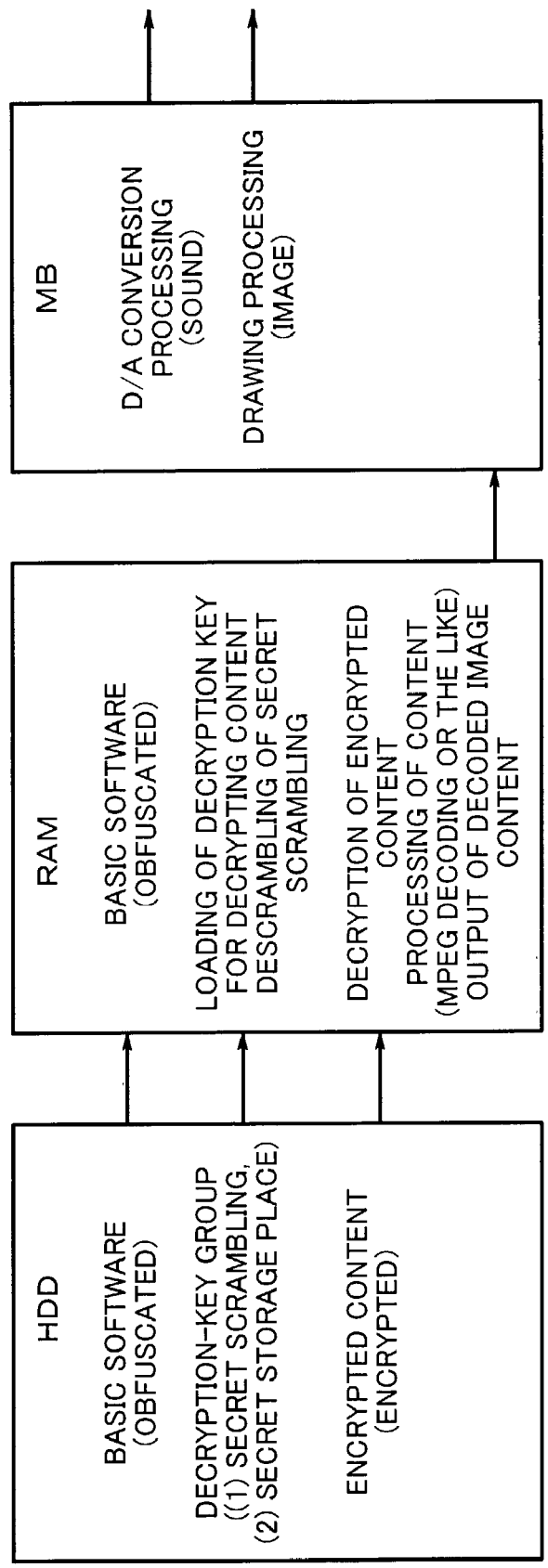
FIG. 11 is a diagram illustrating a flow of information in the personal computer illustrated in FIG. 10.

FIG. 9 is a diagram illustrating an example of a construction of the seventh embodiment of the present invention. As illustrated in FIG. 9, the digital broadcast receiver 90 illustrated in FIG. 9 comprises a digital tuner 90a, a MULTI2 decryption unit 90b, a B-CAS card 90c, a reencryption-and-license-generation unit 90d, an HDD 90e, a software-decryption-and-reproduction-licensing unit 90f, a software MPEG decoder 90g, a software AAC decoder 90h, a graphic processing unit 90i, a sound processing unit 90j, and an HDCP LSI 90k. In addition, a parabola antenna 91 is externally connected to the digital broadcast receiver 90. Further, in the seventh embodiment, the MULTI2 decryption unit 90b, the reencryption-and-license-generation unit 90d, the software-decryption-and-reproduction-licensing unit 90f, the software MPEG decoder 90g, the software AAC decoder 90h, the graphic processing unit 90i, and the sound processing unit 90j are sealed into an LSI.

The digital tuner 90a converts electromagnetic waves transmitted from a satellite and captured by the parabola antenna 91, into electric signals (digital signals), and outputs the electric signals (digital signals).

The MULTI2 decryption unit 90b decrypts MULTI2 encryptions applied to encrypted digital signals which are output from the digital tuner 90a, decodes the decrypted digital signals into original data, and outputs the original data.

The B-CAS card 90c is a plastic card in which an IC chip is built, and stores information for authentication of a user.

The reencryption-and-license-generation unit 90d generates license information required for reencryption, and performs reencryption processing.

The HDD 90e stores in a predetermined region the data supplied from the reencryption-and-license-generation unit 90d.

The software-decryption-and-reproduction-licensing unit 90f generates a reproduction license, decodes encryptions applied to data which are read out from the HDD 90e, in accordance with the reproduction license, and generates original data.

The software MPEG decoder 90g performs MPEG decode processing of AV content supplied from the software-decryption-and-reproduction-licensing unit 90f, and generates image data.

The software AAC decoder 90h decodes sound signals, and generates and outputs original sound data.

The graphic processing unit 90i performs drawing processing of the image data supplied from the software MPEG decoder 90g, and outputs obtained image signals to the HDCP LSI 90k.

The HDCP LSI 90k performs HDCP processing of the image signals supplied from the graphic processing unit 90i, and outputs the processed image signals.

The sound processing unit 90j performs D/A conversion of the sound data output from the software AAC decoder 90h, and outputs the converted result.

In the construction of FIG. 9, the software-decryption-and-reproduction-licensing unit 90f, the software MPEG decoder 90g, and the software AAC decoder 90h are realized by software.

Therefore, as in the fifth and sixth embodiments, it is possible to prevent unauthorized use of received content by a malicious user by providing the functions of the secure module 11 illustrated in FIG. 1 in the function blocks constituted by an LSI, and arranging the function blocks realized by the software in FIG. 9 to have the functions in the memory 10 illustrated in FIG. 1.

In the seventh embodiment, the function blocks realized by the software are also sealed into the LSI. Therefore, the security can be further improved.

The above embodiments indicated by the block diagrams are merely examples, and the present invention is not limited to the above embodiments.

The function blocks which are realized by software in the above embodiments may be realized by hardware as appropriate.

As explained above, according to the present invention, an information reproducing apparatus for reproducing information which is transmitted through a transmission medium or stored in a recording medium is provided, and the information reproducing apparatus comprises: a secure module storing first information and having a structure which does not allow access to the first information from outside; a memory which can be accessed from outside; a decryption unit which is loaded in the memory, and decrypts an encryption applied to the first information by using a predetermined key; a key supply unit which is implemented in the secure module, and supplies the predetermined key to the decryption unit; an authentication unit which is implemented in the secure module, supplies second information to the decryption unit, refers to third information returned in response to the second information, and checks for authenticity of the decryption unit; and a key-supply stop unit which is implemented in the secure module, and stops supply of the predetermined key by the key supply unit when the authentication unit does not authenticate the decryption unit. Therefore, in the case where information is reproduced by an apparatus having an open architecture such as a personal computer, it is possible to construct a safe system by adding a minimum amount of hardware to the apparatus.

In addition, according to the present invention, a secure module is provided. The secure module can be detachably mounted on an information reproducing apparatus and executes processing related to security when the information reproducing apparatus reproduces information which is transmitted through a transmission medium or stored in a recording medium, where the information reproducing apparatus includes a memory which can be accessed from outside, and decryption unit which is loaded in the memory, and decrypts an encryption applied to the first information by using a predetermined key. Further, the secure module comprises: a key supply unit which is implemented in the secure module, and supplies the predetermined key to the decryption unit; an authentication unit which is implemented in the secure module, supplies second information to the decryption unit, refers to third information returned in response to the second information, and checks for authenticity of the decryption unit; and a key-supply stop unit which is implemented in the secure module, and stops supply of the predetermined key by the key supply unit when the authentication unit does not authenticate the decryption unit. Therefore, when the above secure module is mounted on the information reproducing apparatus, the secure module can improve the security of the system with a minimum amount of hardware.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information reproducing apparatus for reproducing information which is transmitted through a transmission medium or stored in a recording medium, comprising:
   a secure module, which is a tamper resistant module structure not allowing access to first information from outside, and stores the first information;
   an insecure memory which allows unauthorized access and tampering of data from outside; and
   a controller configured for:
      loading a different decryption unit in the insecure memory every time the decryption unit is loaded, so that the decryption unit decrypts the encryption in a different manner every time the decryption unit is loaded, and
      executing the decryption unit in the insecure memory for decrypting an encryption applied to encrypted content information by using a predetermined key,
   wherein:
      a key supply unit which is implemented in the secure module, supplies the first information as the predetermined key to the decryption unit in the insecure memory for decrypting the encrypted content information;
      an authentication unit which is implemented in the secure module, supplies second information to the decryption unit in the insecure memory at predetermined time intervals, refers to third information returned from the decryption unit in the insecure memory in response to the second information, and checks authenticity of the decryption unit in the insecure memory based on the third information, where the second information is predetermined; and
      a key-supply stop unit which is implemented in the secure module, stops supply of the predetermined key by the key supply unit when the authentication unit does not authenticate the decryption unit in the insecure memory.

2. The information reproducing apparatus according to claim 1, wherein the authentication unit changes an initial value of the second information every time the information reproducing apparatus is started up.

3. The information reproducing apparatus according to claim 1, wherein the authentication unit has a plurality of protocols checking for authenticity of the decryption unit, and changes a currently used protocol from one to another of the plurality of protocols at predetermined time intervals.

4. The information reproducing apparatus according to claim 1, wherein the key supply unit stops the supply of the predetermined key when the third information is not returned from the decryption unit in a predetermined time.

5. The information reproducing apparatus according to claim 1, wherein the key supply unit stops the supply of the predetermined key when more than one identical response is successively returned from the decryption unit.

6. The information reproducing apparatus according to claim 1, wherein the decryption unit, the key supply unit, the authentication unit, and the key-supply stop unit are, in advance, encrypted and stored in a recording medium, and encryptions applied to the decryption unit, the key supply unit, the authentication unit, and the key-supply stop unit are decrypted and loaded in the insecure memory or the secure module as necessary.

7. The information reproducing apparatus according to claim 1, wherein the decryption unit is loaded in a different region of the insecure memory on every loading operation.

8. The information reproducing apparatus according to claim 1, wherein the decryption unit is loaded in the insecure memory so that the decryption unit uses a different region of the insecure memory on every loading operation.

9. The information reproducing apparatus according to claim 1, wherein the decryption unit is loaded in the insecure memory so that the decryption unit uses a different register on every loading operation.

10. The information reproducing apparatus according to claim 1, further comprising:
    an output unit which outputs the encrypted content information after the encrypted content information is decrypted by the decryption unit; and
    an encryption unit which reencrypts the encrypted content information after the encrypted content information is decrypted by the decryption unit before the encrypted content information is output by the output unit.

11. The information reproducing apparatus according to claim 10, wherein the encryption unit selects one of a plurality of protocols for reencrypting the encrypted content information after the encrypted content information is decrypted by the decryption unit.

12. The information reproducing apparatus according to claim 11, wherein the encryption unit is realized by loading a program stored in the secure module, in the insecure memory.

13. The information reproducing apparatus according to claim 1, wherein a plurality of unit loaded in the insecure memory set an interruption prohibit flag in order to prohibit interruption by another program when the plurality of unit operate.

14. The information reproducing apparatus according to claim 1, wherein every time a program stored in the secure module is loaded in the insecure memory, the program is encrypted in a different manner and supplied to the insecure memory.

15. The information reproducing apparatus according to claim 1, wherein the secure module is constituted by a detachable device.

16. A secure module storing first information and capable of being detachably mounted on an information reproducing apparatus and executing processing related to security when the information reproducing apparatus reproduces information which is transmitted through a transmission medium or stored in a recording medium, where the information reproducing apparatus includes an insecure memory which allows unauthorized access and tampering of data from outside, and a controller loading, in the insecure memory, as a decryption unit for decrypting an encryption applied to encrypted content information by using a predetermined key, the secure module, which is a tamper resistant module structure, comprising:

a key supply unit which is implemented in the secure module, and supplies the first information as the predetermined key to a different decryption unit that is loaded in the insecure memory every time the decryption unit is loaded, so that the decryption unit decrypts the encryption in a different manner every time the decryption unit is loaded;

an authentication unit which is implemented in the secure module, supplies second information to the decryption unit in the insecure memory at predetermined time intervals, refers to third information returned from the decryption unit in the insecure memory in response to the second information, and checks for authenticity of the decryption unit in the insecure memory based on the third information, where the second information is predetermined; and a key-supply stop unit which is implemented in the secure module, and stops supply of the predetermined key by the key supply unit when the authentication unit does not authenticate the decryption unit in the insecure memory.

17. An information reproducing method for reproducing information, using an information reproducing apparatus, which is transmitted through a transmission medium or stored in a recording medium, comprising:

storing first information in a secure module having a tamper resistant module structure which does not allow access to the first information from outside;

loading a different decryption software into an insecure memory every time the decryption software is loaded, so that the decryption software decrypts an encryption in a different manner every time the decryption software is loaded;

decrypting by the decryption software in the insecure memory an encryption applied to encrypted content information by using a predetermined key;

supplying, by the secure module, the first information as the predetermined key to the decryption software in the insecure memory;

supplying, by the secure module, second information to the decryption software in the insecure memory at predetermined time intervals, referring to third information returned from the decryption software in the insecure memory in response to the second information, and checking for authenticity of the decryption software in the insecure memory based on the third information, where the second information is predetermined; and stopping, by the secure module, supply of the predetermined key when the decryption software in the insecure memory is not authenticated.

18. The information reproducing method according to claim 17, further comprising changing an initial value of the second information every time the information reproducing apparatus is started up.

19. The information reproducing method according to claim 17, further comprising checking for authenticity of the decryption software using one of a plurality of protocols, and changing a currently used protocol to another of the plurality of protocols at predetermined time intervals.

20. The information reproducing method according to claim 17, further comprising stopping the supply of the predetermined key when the third information is not returned in a predetermined time.

21. The information reproducing method according to claim 17, further comprising stopping the supply of the predetermined key when more than one identical response is successively returned from the decryption software.

22. The information reproducing method according to claim 17, further comprising encrypting and storing a decryption unit, a key supply unit, an authentication unit, and a key-supply stop unit, in advance, in a recording medium, and decrypting and loading encryptions applied to the decryption unit, the key supply unit, the authentication unit, and the key-supply stop unit in the insecure memory or the secure module, as necessary.

23. The information reproducing method according to claim 17, further comprising loading a decryption unit in a different region of the insecure memory on every loading operation.

24. The information reproducing method according to claim 17, wherein the decryption software uses a different region of the insecure memory on every loading operation.

25. The information reproducing method according to claim 17, wherein the decryption software uses a different register on every loading operation.

26. The information reproducing method according to claim 17, further comprising:

outputting the encrypted content information after the encrypted content information is decrypted; and reencrypting the encrypted content information after the encrypted content information is decrypted before the encrypted content information is output.

27. The information reproducing method according to claim 26, further comprising selecting one of a plurality of protocols reencrypting the encrypted content information after the encrypted content information is decrypted.

28. The information reproducing method according to claim 27, wherein the reencrypting is realized by loading a program stored in the secure module, in the insecure memory.

29. The information reproducing method according to claim 17, further comprising setting an interruption prohibit flag in order to prohibit interruption by another program when the plurality of unit operate.

30. The information reproducing method according to claim 17, wherein every time a program stored in the secure module is loaded in the memory, the program is encrypted in a different manner and supplied to the insecure memory.

31. The information reproducing method according to claim 17, wherein the secure module is constituted by a detachable device.

32. A method, comprising:

using a computer, which includes an insecure memory that allows unauthorized external access and tampering of data, and a secure module storing first information and having a tamper resistant module structure which does not allow access to the first information from outside, to execute:

loading a different decryption software into the insecure memory every time the decryption software is loaded, so that the decryption software decrypts an encryption in a different manner every time the decryption unit is loaded;

decrypting by the decryption software in the insecure memory encrypted content information, which is different from the first information, by using a predetermined key; and supplying by the secure module the first information as the predetermined key to the decryption software in the insecure memory and predetermined second information to the decryption software in the insecure memory at predetermined time intervals;

referring by the secure module to third information returned from the decryption software in the insecure memory in response to the second information; and checking by the secure module authenticity of the decryption software in the insecure memory based on the third information.

* * * * *